(12) United States Patent
Arends et al.

(10) Patent No.: US 9,964,439 B2
(45) Date of Patent: May 8, 2018

(54) METHODS AND APPARATUS FOR AN OPTICAL SYSTEM OUTPUTTING DIFFUSE LIGHT AND HAVING A SENSOR

(71) Applicant: FiftyThree, Inc., New York, NY (US)

(72) Inventors: Thomas C. Arends, Bellevue, WA (US); Nicholas E. Bratt, Edmonds, WA (US); John K. Ikeda, Seattle, WA (US); Jonathan R. Harris, Redmond, WA (US); Georg F. Petschnigg, New York, NY (US)

(73) Assignee: FiftyThree, Inc., New York, NY (US)

( * ) Notice: Subject to any disclaimer, the term of this patent is extended or adjusted under 35 U.S.C. 154(b) by 0 days. days.

(21) Appl. No.: 15/135,120

(22) Filed: Apr. 21, 2016

(65) Prior Publication Data
US 2016/0377479 A1    Dec. 29, 2016

Related U.S. Application Data

(63) Continuation of application No. 13/828,907, filed on Mar. 14, 2013, now Pat. No. 9,323,355.

(51) Int. Cl.
| | |
|---|---|
| *G06F 3/033* | (2013.01) |
| *G01J 1/42* | (2006.01) |
| *G06F 3/03* | (2006.01) |
| *G06F 3/0354* | (2013.01) |

(52) U.S. Cl.
CPC .......... *G01J 1/4228* (2013.01); *G06F 3/0304* (2013.01); *G06F 3/03545* (2013.01)

(58) Field of Classification Search
CPC ............... G06F 3/03542; G06F 3/0304; G06F 3/03545; G01J 1/4228

USPC ................................ 345/179–183; 178/19.05
See application file for complete search history.

(56) References Cited

U.S. PATENT DOCUMENTS

| | | | |
|---|---|---|---|
| 5,444,193 A | * | 8/1995 | Satoh .................... G06F 3/0317 178/19.05 |
| 7,670,070 B2 | | 3/2010 | Craven-Bartle |
| 7,868,878 B2 | | 1/2011 | Craven-Bartle et al. |
| 9,297,750 B2 | | 3/2016 | Arends et al. |
| 9,323,355 B2 | * | 4/2016 | Arends ................ G06F 3/0304 |
| 2003/0197690 A1 | * | 10/2003 | Zimenkov ........... G06F 3/03542 345/179 |
| 2005/0073508 A1 | * | 4/2005 | Pittel .................... G06F 1/3203 345/175 |
| 2007/0013661 A1 | | 1/2007 | Theytaz et al. |

(Continued)

OTHER PUBLICATIONS

Non-Final Office Action for U.S. Appl. No. 13/828,907, filed Mar. 14, 2013, and mailed from the USPTO dated Apr. 2, 2015, 14 pgs.

(Continued)

*Primary Examiner* — Rodney Amadiz
(74) *Attorney, Agent, or Firm* — Stoel Rives, LLP

(57) ABSTRACT

In some embodiments, an apparatus includes a housing and an image sensor that is coupled to the housing and has a field of view. The apparatus also includes a non-imaging optical system coupled to the housing and disposed outside of the field of view of the image sensor. The non-imaging optical system can output diffuse light in a set of directions to a surface to produce scattered light. The image sensor and the non-imaging optical system are collectively configured such that during operation, the image sensor receives at least a portion of the scattered light.

15 Claims, 7 Drawing Sheets

(56) References Cited

U.S. PATENT DOCUMENTS

| | | | |
|---|---|---|---|
| 2010/0021022 A1* | 1/2010 | Pittel | G06F 3/03545 |
| | | | 382/123 |
| 2011/0007037 A1 | 1/2011 | Ogawa | |
| 2011/0090178 A1 | 4/2011 | Lai et al. | |
| 2011/0310066 A1 | 12/2011 | Fermgard et al. | |
| 2014/0268161 A1* | 9/2014 | Arends | G01N 21/4738 |
| | | | 356/446 |
| 2016/0252982 A1 | 9/2016 | Arends et al. | |

OTHER PUBLICATIONS

Non-Final Office Action for U.S. Appl. No. 13/828,928, filed Mar. 14, 2013, and mailed from the USPTO dated Apr. 13, 2015, 23 pgs.
Notice of Allowance and Fee(s) Due for U.S. Appl. No. 13/828,907, filed Mar. 14, 2013, and mailed from the USPTO dated December 18, 2015, 11 pgs.
Notice of Allowance for U.S. Appl. No. 13/828,928, filed Mar. 14, 2013, dated Nov. 12, 2015, 9 pgs.

* cited by examiner

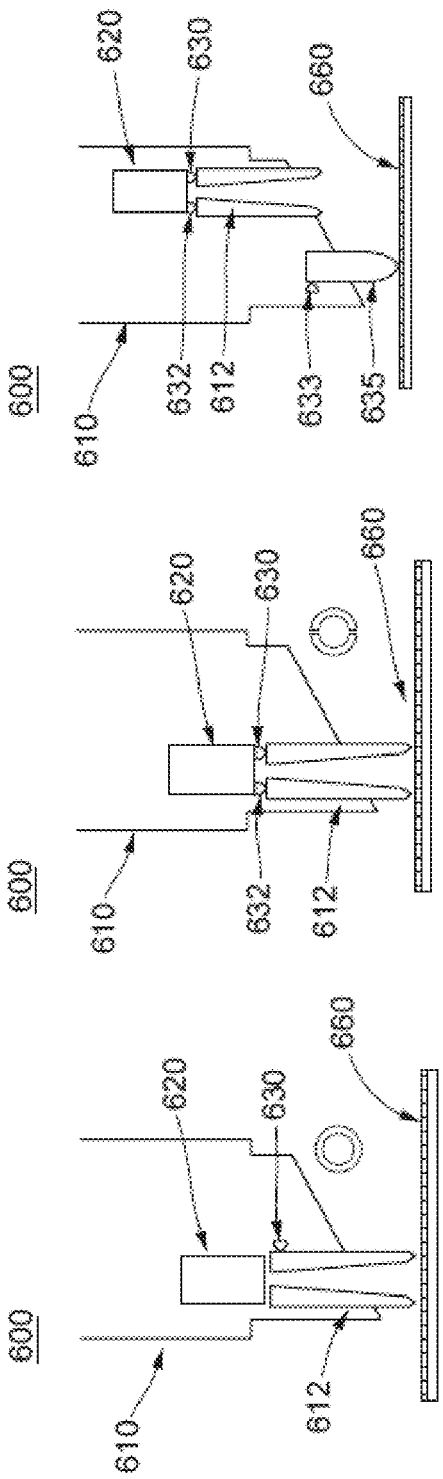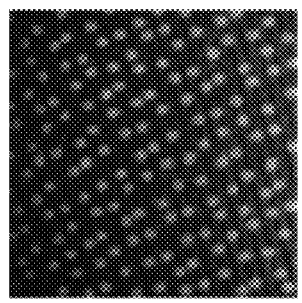

METHODS AND APPARATUS FOR AN OPTICAL SYSTEM OUTPUTTING DIFFUSE LIGHT AND HAVING A SENSOR

CROSS-REFERENCE TO RELATED APPLICATIONS

This application is a continuation of U.S. patent application Ser. No. 13/828,907, entitled "Methods and Apparatus for an Optical System Outputting Diffuse Light and Having a Sensor," filed Mar. 14, 2013, which is related to U.S. patent application Ser. No. 13/828,928, now U.S. Pat. No. 9,279,750, entitled "Methods and Apparatus for an Optical System Outputting Direct Light and Having a Sensor," filed Mar. 14, 2013, the entirety of each which is incorporated by reference herein in its entirety.

BACKGROUND

The embodiments described herein relate generally to methods and apparatus for a dark field illumination system. More specifically, the embodiments described herein relate to methods and apparatus for an optical system outputting diffuse light and having a sensor.

Pen strokes by handheld devices such as electronic pens or styluses on display surfaces can be digitally recorded by optical tracking systems contained within the handheld devices. The optical tracking systems typically include miniaturized cameras or sensors that can digitally record the pen strokes on the display surfaces. Known optical tracking systems use opaque dots to register position with a digital pen. These dots are typically invisible to the naked eye but detectable by the optical tracking system. Such known optical tracking systems typically use a wide field of view to receive sufficient reflections from the dots and have relatively low resolution.

Accordingly, a need exists for improved systems and method for the accurate and high resolution determination of position information of handheld devices on display surfaces.

SUMMARY

In some embodiments, an apparatus includes a housing and an image sensor that is coupled to the housing and that has a field of view. The apparatus also includes a non-imaging optical system coupled to the housing and disposed outside of the field of view of the image sensor. The non-imaging optical system can output diffuse light in a set of directions to a surface to produce scattered light. The image sensor and the non-imaging optical system are collectively configured such that during operation, the image sensor receives at least a portion of the scattered light.

BRIEF DESCRIPTION OF THE DRAWINGS

FIGS. 11A-C are two-dimensional (2-D) cross-section diagrams of an imaging apparatus, according to different embodiments.

FIG. 11D is an example of a dark-field image of the scattering microparticles obtained by an imaging apparatus, according to an embodiment.

DETAILED DESCRIPTION

In some embodiments, an apparatus includes a housing and an image sensor that is coupled to the housing and that has a field of view. The apparatus also includes a non-imaging optical system coupled to the housing and disposed outside of the field of view of the image sensor. The non-imaging optical system can output diffuse light in a set of directions to a surface to produce scattered light. The image sensor and the non-imaging optical system are collectively configured such that during operation, the image sensor receives at least a portion of the scattered light.

In some embodiments, an apparatus includes a housing and an image sensor coupled to the housing and having a field of view. The apparatus also includes a non-imaging optical system coupled to the housing and disposed outside of the field of view of the image sensor. The non-imaging optical system can output diffuse light in a set of directions from at least a first location and a second location of a distal end portion of the non-imaging optical system. The apparatus includes at least a portion of the field of view of the image sensor between the first location and the second location. The image sensor can receive from the surface at least one of a scattered light component associated with the first location or a scattered light component associated with the second location.

In some embodiments, an apparatus includes a diffusion light guide coupled to a stylus housing. The diffusion light guide includes a proximal end portion and a distal end portion. The diffusion light guide can receive light at the proximal end portion from a light source. The diffusion light guide can send diffuse light from the distal end portion to a surface to produce a scattered light component that is received within an aperture of the diffusion light guide.

As used in this specification, the singular forms "a," "an" and "the" include plural referents unless the context clearly dictates otherwise. Thus, for example, the term "an image sensor" is intended to mean a single image sensor or multiple image sensors.

As used in this specification, the terms "housing" and "stylus housing" relate to, for example, the outer container or cover of an imaging apparatus that holds the optical, electronic and mechanical components of the imaging apparatus, and can be used interchangeably unless the context clearly dictates otherwise.

Figure 1:
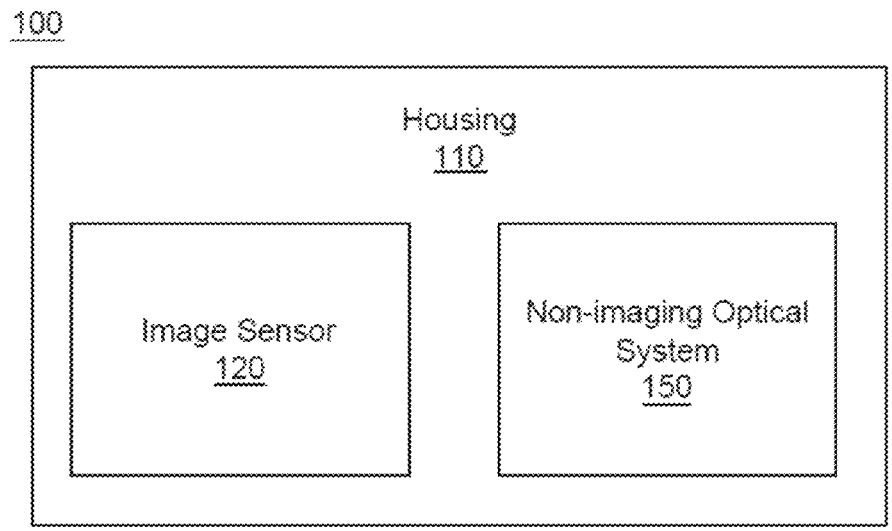
FIG. 1 is a block diagram of an imaging apparatus, according to an embodiment.

FIG. 1 is a block diagram of an imaging apparatus, according to an embodiment. The imaging apparatus 100 includes a housing 110, an image sensor 120 coupled to the housing 110 and having a field of view, and a non-imaging optical system 150 coupled to the housing 110. The housing 110 can be made of, for example, plastic, steel, aluminum, etc. The housing 110 can be elongate and pen-shaped, and can include one or more parts that can carry or enclose other parts of the imaging apparatus 100 such as, for example, a battery (not shown in FIG. 1). Each of the compartments of the housing 110 can be accessible via a fully or semi-detachable lid. The housing 110 can also define one or more spaces for one or more printed circuit boards (PCB) that can contain the electronics for determining the accurate position information associated with the imaging apparatus 100. The housing 110 can define a first opening through which images can be captured by the image sensor 120 and a second opening through which a stylus (not shown in FIG. 1) of the writing tip can protrude or extend.

The image sensor 120 is coupled to and/or disposed within the housing 110 of the imaging apparatus 100 and has a field of view (FOV). In some configurations, the image sensor 120 and the non-imaging optical system 150 can be collectively set up or configured such that the image sensor 120 can receive at least a portion of the light scattered and reflected from a surface (e.g., a film) after being illuminated by the non-imaging optical system 150. The image sensor 120 can detect the power of the scattered light and the power of the specular reflected light. The image sensor 120 can be arranged to define an object plane and an image plane, where an object that is located in a field of view in the object plane is reproduced as an image in the image plane. The image sensor 120 can also include a photo-detector that is substantially co-located with the image plane to physically or electronically capture the image. Such a photo-detector can be, for example, a Image Dissector Tube, a charge coupled device (CCD) camera, a photodiode array detector, a pixel array detector, an avalanche photodiode (APD), and/or the like. In some configurations, the image sensor 120 and the non-imaging optical system 150 can be collectively configured such that, during operation of the imaging apparatus 100, the image sensor 120 receives at least a portion of the received scattered light and at least a portion of the specular reflected light component, but the magnitude of the received scattered light is less than the magnitude of the portion of the received specular reflected light.

In the imaging apparatus 100 shown in FIG. 1, the illumination pathway is the path taken by the illumination light propagating from a light source (of the non-imaging optical system 150) via one or multiple optical, electrical and/or mechanical components to impinge upon the target (e.g., a surface of a film). The imaging pathway is the path taken by the scattered light propagating from the scattering microparticles (located within a film) via one or multiple optical, electrical and/or mechanical components to the imaging sensor 120. After detecting the power of the scattered and/or specular reflected light, the image sensor 130 can send an output voltage to, for example, a control module (not shown in FIG. 1). In some configurations, the image sensor 120 can include optional beam shaping/collection lenses that can enhance the efficiency of scattered light collection. In yet other configurations, the image sensor 130 can include two or more photo-detectors to establish multiple imaging pathways.

The non-imaging optical system 150 can include light sources such as, for example, light emitting diodes (LEDs), organic light emitting diodes (OLEDs), semiconductor lasers, and/or the like. Additionally, the non-imaging optical system 150 can also include optical lenses and/or prisms to efficiently deliver the illumination light to the target surface and include electronic or mechanical optical shutters to select the optimal image path. In some configurations, the non-imaging optical system 150 can also include a diffusion light guide that has a proximal end portion and a distal end portion. The diffusion light guide can be operatively coupled to the light source and configured to send the diffuse light from the distal end portion of the diffusion light guide from at least a first location and a second location where a portion of the field of view is between the first location and the second location. In other configurations, the non-imaging optical system includes a light source and a diffusion light guide having a distal end portion, a remaining portion, an inner surface and an outer surface. The light source contained within the non-imaging optical system 150 can output light having a range of wavelengths and the diffusion light guide can receive the light from the light source and can send the diffuse light from the distal end portion of the diffusion light guide. In such configurations, the inner surface of the remaining portion of the diffusion light guide can be an absorptive surface at the range of wavelengths; the outer surface of the diffusion light guide can be a reflective surface at the range of wavelengths.

In other configurations, the non-imaging optical system 150 can include a light source and a diffusion light guide having a distal end portion and a remaining portion. In such configurations, the diffusion light guide can be operatively coupled to the light source and configured to send the diffuse light from the distal end portion of the diffusion light guide in a substantially circular pattern, while the field of view along the remaining portion of the diffusion light guide can be substantially surrounded by the remaining portion of the diffusion light guide.

In yet other configurations, the non-imaging optical system 150 can include a first light source, a second light source, a segmented diffusion light guide that defines a first diffusion light guide and a second diffusion light guide. In such configurations, the first diffusion light guide can have a distal end portion and a remaining portion, and the second diffusion light guide can have a distal end portion and a remaining portion. In such configurations, the first diffusion light guide can be operatively coupled to the first light source and configured to send a portion of the diffuse light from the distal end portion of the first diffusion light guide in a first substantially arcuate pattern. In such configurations, the second diffusion light guide can be operatively coupled to the second light source and configured to send a portion of the diffuse light from a distal end portion of the second diffusion light guide in a second substantially arcuate pattern. The first substantially arcuate pattern and the second substantially arcuate pattern can collectively define a substantially circular pattern. In such configurations, the field of view collectively along the remaining portion of the first diffusion light guide and the remaining portion of the second diffusion light guide can be substantially surrounded by the remaining portion of the first diffusion light guide and the remaining portion of the second diffusion light guide.

Furthermore, in other configurations, the non-imaging optical system 150 can be a first non-imaging optical system. In such configurations, the image sensor 130 and the first non-imaging optical system 150 can be collectively configured such that the image sensor 130, during operation, does not receive a specular reflected light component associated with a first location and a specular reflected light component associated with a second location. In such configurations, the imaging apparatus 100 can include a second non-imaging optical system coupled to and/or disposed within the housing 110 and configured to output light to the surface to produce a specular reflected light component. In such configurations, the image sensor 130 and the second non-imaging optical system can be collectively configured such that, during operation, the image sensor 130 receives at least a portion of the specular reflected light component output by the second non-imaging optical system.

Figure 2:
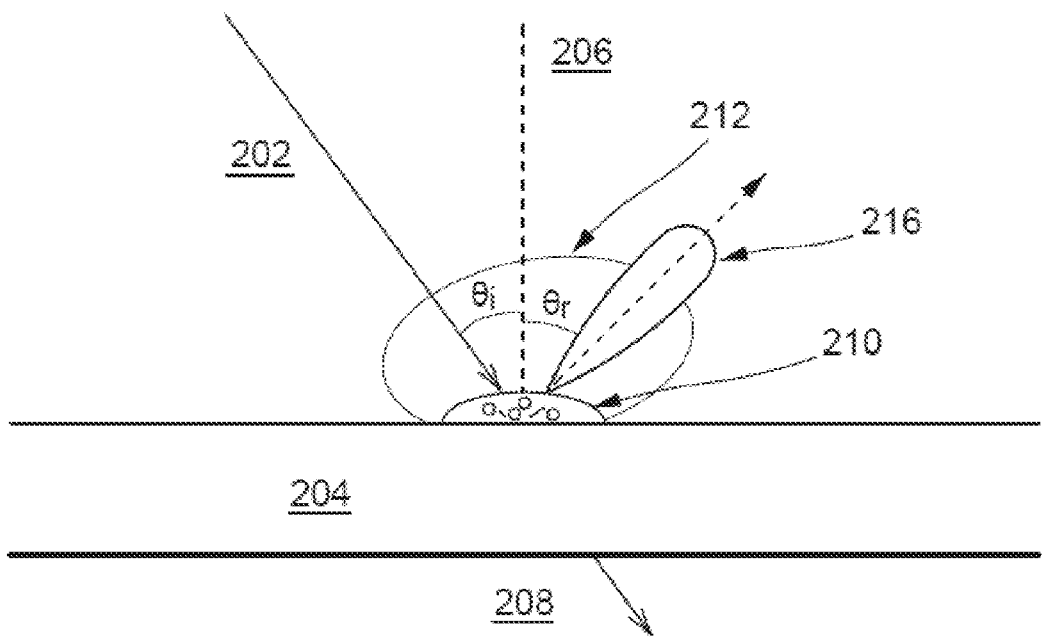
FIG. 2 is a diagram showing an example of light scattered and reflected after impinging upon a clear polyethylene terephthalate (PET) film coated with scattering microparticles, according to an embodiment.

FIG. 2 is a diagram showing an example of light scattered and reflected after impinging the surface of a clear polyethylene terephthalate (PET) film coated with scattering microparticles, according to an embodiment. The incident illumination 202 impinges upon the surface of the clear PET film 204 at an angle of incidence ($\theta_i$) with respect to the surface normal 206. The scattering microparticles are translucent and hence a significant amount of the incident illumination passes through the clear PET film 204. Hence, approximately 50-75% of the incident illumination is transmitted through the clear PET film as the transmitted light 208 as shown in FIG. 2. The scattering of the illumination light by the scattering microparticles present on the surface of the clear PET film 204 can be dependent on a number of parameters such as, for example, the loading density of the scattering microparticles 210, the size of the scattering microparticles 210, the shape of the scattering microparticles 210, the material used in the scattering microparticle 210 fabrication, the propensity of the scattering microparticles 210 to form aggregates and other higher order structures, etc. Hence, the exact distribution of scattered light 212 in some cases can be isotropic in nature.

Many applications based on optical detection assume perfect diffuse reflections and assume specular reflections to be an outlier phenomenon. In reality, however, the presence of specular reflections is inevitable. Hence, incorporating the knowledge of specular reflections is desirable to make the optical detection methods robust. For a perfectly flat and smooth surface (i.e., a perfect mirror), the direction of specular reflection 216 follows the law of reflection, which states the angle of incoming illumination $\theta_i$ and the angle of outgoing reflected light are the same ($\theta_i = \theta_r$). In many surfaces that are not perfect mirrors, however, a certain degree of specularity can also be observed even though the direction of reflection $\theta_r$ is not identical to the direction of incidence $\theta_i$. In other words, specular reflections do not only form a sharp line (spike) distribution of reflection, but can also form a lobe distribution. Therefore, specular reflections can form two components: (1) specular spike and (2) specular lobe 216, which is illustrated in FIG. 2. The size and shape of the lobe of the specular reflected light 216 can depend on the size and the granularity of surface imperfections. Additionally, the specular reflection lobe 216 width is also dependent on the nature of the surface roughness and scale of the surface roughness compared to the incident light wavelength.

Figure 3:
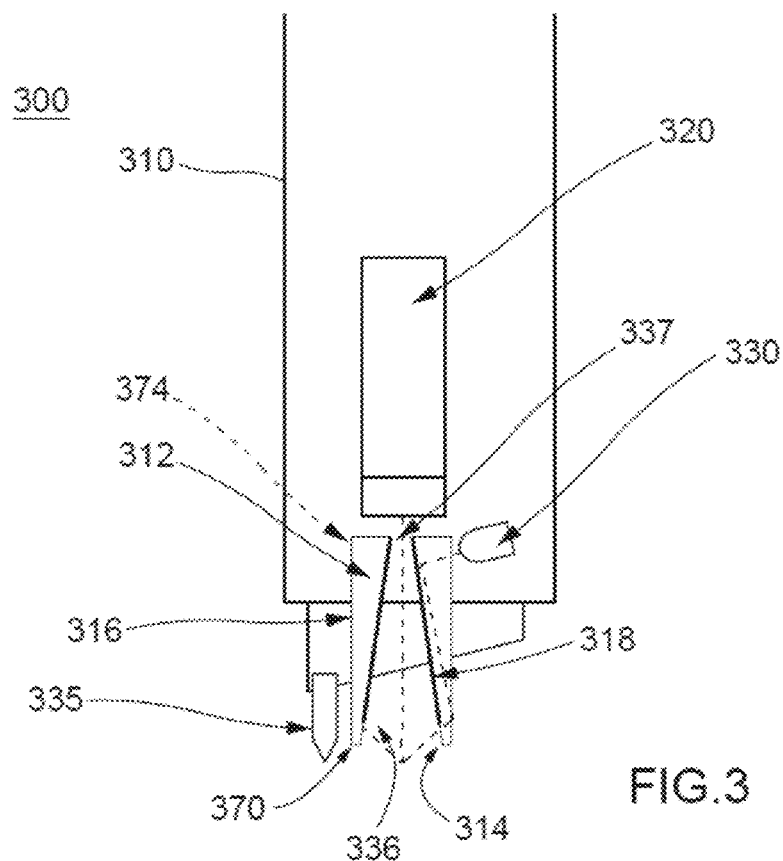
FIG. 3 is a two-dimensional (2-D) cross-section diagram of an imaging apparatus, according to an embodiment.

FIG. 3 is a two-dimensional (2-D) cross-section diagram of an imaging apparatus, according to an embodiment. The imaging apparatus 300 produces a single diffuse light ring illumination towards the target surface. The imaging apparatus 300 includes a housing 310, an image sensor 320, an LED 330, a stylus 335, a diffusion light guide 312 that defines an exit window 314 and has an external reflective surface 316 and an internal absorbing surface 318. The diffusion light guide 312 has a distal portion 370 as denoted by the bold dotted arrow in FIG. 3 and a remaining portion 372 (see FIG. 4) that is between the distal end portion 370 and a proximal end portion 374 (also denoted by a bold dotted arrow) and includes the proximal end portion 374. The proximal end portion 374, the distal end portion and 370 the remaining portion 372 of the diffusion light guide 312 can also be seen in the expanded view of the diffusion light guide 312 shown in FIG. 4. The diffusion light guide 312 is operatively coupled to the LED 330 and can send the diffuse light of a single wavelength or a range of wavelengths from the exit window 314 of the diffusion light guide 312 in a substantially circular or annular pattern (as shown in FIG. 5 and discussed further below).

Note that FIG. 3 is a 2-D cross sectional diagram of the imaging apparatus 300. In 3-dimensions (3-D), the diffusion light guide 312 can substantially be a two-layered cylindrical structure. The two-layered cylindrical structure can include an external layer 312a and an internal layer 312b. The external layer can be composed of, for example, a solid plastic, metallic or polymer material that is coated with the reflective surface 316. The external layer 312a is tapered and beveled at the distal end portion to concentrate the illumination light at the exit window 314 (see FIG. 4). The internal layer 312b can be a conical structure that can be composed of, for example, glass or any other polymer material that is transparent to light in the range of wavelengths used in the imaging apparatus 300. Alternatively, internal layer 312b can be air.

The field of view of the image sensor 320 along the remaining portion of the diffusion light guide 312 is substantially surrounded by the remaining portion of the diffusion light guide 312. The diffusion light guide 312 is coupled to the housing (or stylus housing) 310 and can receive light at the proximal end portion of the diffusion light guide 374 from the light source (e.g., LED 330) and send diffuse light from the distal end portion of the diffusion light guide 370 to the (target) surface to produce a scattered light component (from the scattering microparticles). The scattered light component is received within the distal end portion aperture 336 of the internal layer 312b of the diffusion light guide (see FIG. 4). The diffusion light guide 312 is operatively coupled to the image sensor 320 and during operation, the received scattered light travels through the diffusion light guide 312 and impinges upon the image sensor 320 via the proximal end portion aperture 337 of the internal layer 312b of the diffusion light guide (see FIG. 4).

Figure 4:
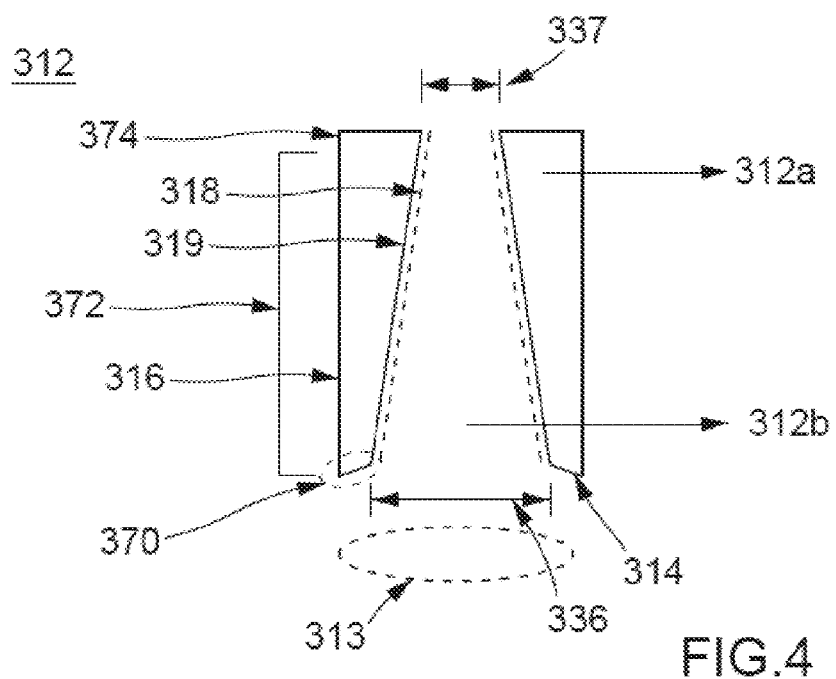
FIG. 4 is a two-dimensional (2-D) cross-section diagram showing an expanded view of the diffusion light guide of FIG. 3.
Figure 5:
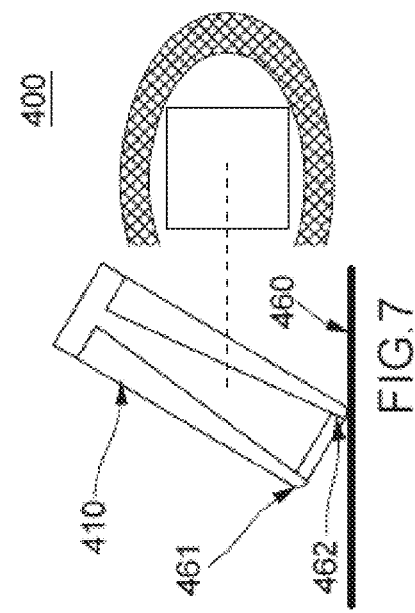
FIG. 5 is a display of a substantially circular illumination beam pattern formed at the exit window of the diffusion light guide of the imaging apparatus of FIG. 3.

The diffusion light guide 312 is tapered to concentrate the light at the exit window 314 (see FIG. 4). Additionally, the exit window 314 is also beveled to direct the illumination light into the imaging zone 313 (see FIG. 4). The (optional) reflective coating 316 on the external surface of the diffusion light guide 312 improves the optical efficiency for one or a range of illumination wavelengths. Note that the internal surface of the external layer 312a of the diffusion light guide 312 has two distinct portions 318 and 319 (see FIG. 4). The inner portion of the internal surface 319 that faces the incident illumination light has a reflective coating to reflect the incident illumination light. The outer portion of the internal surface 318 has an absorptive coating to prevent reflections of the incident illumination light from striking the photo-detector or imaging lens of the image sensor 320. In some configurations, additional focusing and/or beaming lenses and other optical components (e.g., Fresnel prisms) can be added for increased delivery of the illumination light and/or increased collection of the scattered light and/or increased rejection of the specular reflected light.

FIG. 5 is a display of a substantially circular illumination beam pattern formed at the exit window of the diffusion light guide of the imaging apparatus of FIG. 3. In some instances, the profile of the illumination beam can spread out laterally (i.e., along the x and y axes) by the time the illumination beam is incident on the upper surface of the film (e.g., clean PET film in FIG. 2) due to, for example, the effects of scattering (from the air particles) and/or other diffusion effects. Hence, in such instances, the illumination light pattern formed at the surface of the film may not appear to be as substantially circular as the image presented in FIG. 5 and instead may appear to be spread out (or smeared). In other instances, the effects of scattering and/or diffusion may not be isotropic and hence the amount of scattering and/or diffusion of the incident illumination beam along the x-axis can be either greater or lower than that of the scattering and/or diffusion along the y-axis. In such instances, the profile of the illumination beam at the upper surface of the film may be substantially oval in shape (instead of being substantially circular as shown in FIG. 5).

Figure 6:
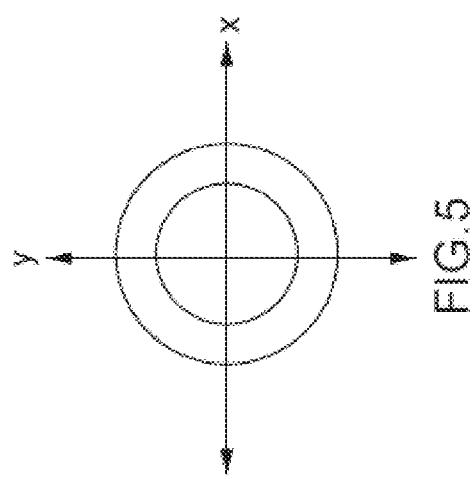
FIG. 6 shows an example of the shape of the illumination beam formed past the exit window of the diffusion light guide on a plane above the surface of a film when an imaging apparatus is oriented vertically (90 degrees) with respect to the surface of the film.

FIG. 6 shows an example of the shape of the illumination beam formed past the exit window of the diffusion light guide on a plane above the surface of the film (e.g., clean PET film in FIG. 2) when the imaging apparatus is oriented vertically (90 degrees) with respect to the surface of the film. FIG. 6 shows that in the vertical orientation, the illumination beam forms a substantially circular pattern on a plane above the film. Additionally, the field of view of the imaging apparatus is contained within with the circular (annular) ring. It is expected that at least a portion of the illumination ring is within the field of view of the imaging apparatus for the illumination light to impinge upon the scattering microparticles in the field of view of the imaging apparatus. In some instances, the scattering of the illumination beam (by the air particles) upon exiting the exit window of the diffusion light guide and/or other optical effects can lead to spreading or smearing of the illumination beam as it strikes the surface of the film. This can lead to a larger portion of the circular (or annular) illumination beam profile being with the field of view of the imaging apparatus and may have the advantageous effect of increasing the sensitivity of the imaging apparatus.

Figure 7:
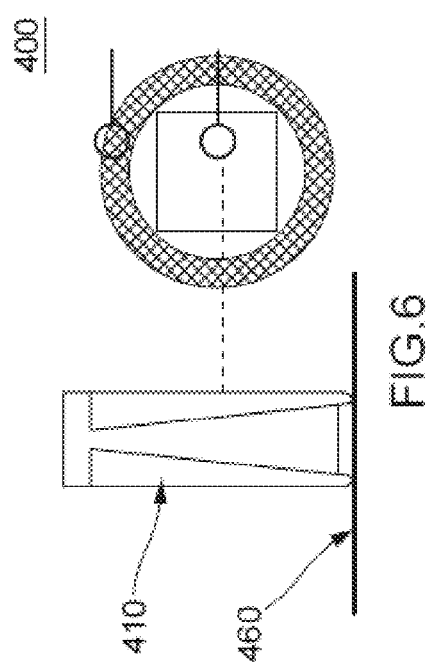
FIG. 7 shows an example of the shape of the illumination beam formed past the exit window of the diffusion light guide on a plane above the surface of the film (e.g., clean PET film in FIG. 2) when the imaging apparatus is oriented at an angle with respect to the surface of the film.

FIG. 7 shows an example of the shape of the illumination beam formed past the exit window of the diffusion light guide on a plane above the surface of the film (e.g., clean PET film in FIG. 2) when the imaging apparatus is oriented at an angle with respect to the surface of the film. FIG. 7 shows that due to the tilted orientation of the housing 410 (of the imaging apparatus 400) with respect to the surface of the film 460, the illumination beam shape formed at the surface of the film 460 is oval in shape and additionally, is non-uniform in width and intensity. The change in shape of the beam shape from being substantially circular (e.g., for the vertical orientation of the imaging apparatus as shown in FIG. 6) being substantially oval is due to the tilt of the housing 410 with respect to the film 460. Hence, the light exiting the exit window of the diffusion light guide from the distant end 461 (i.e., the end that is higher or further away from the surface of the film 460) travels a longer distance than the light exiting the exit window of the diffusion light guide from the closer end 462 (i.e., the end that is lower or closer to the surface of the film 460). As a result, the illumination light from the distant end 461 of the imaging apparatus 400 strikes the surface of the film 460 at a location that is further away from the optical axis compared to the location where the light from the closer end 462 of the imaging apparatus guide strikes the surface of the film 460. Hence, the increased distance traveled by the illumination beam from one end of the imaging apparatus 400 leads to the oval shape of the illumination beam profile. Additionally, the illumination beam profile is non-uniform in width and intensity also because of the tilt of the housing 410 with respect to the surface of the film 460. The increased distance traveled by the illumination light from the distant end 461 of the imaging apparatus 400 leads to increased scattering by the air particles and can also involve additional optical effects. Hence, the intensity of the illumination light from the distant end 461 is lower when compared to the intensity of the illumination light striking the film from the closer end 462 of the imaging apparatus 400. As a result, the illumination light from the distant end 461 of the imaging apparatus 400 gets progressively lower in intensity and width the further the distance the illumination light has to travel before striking the surface of the film 460 (i.e., the further the distance traveled, the lower the illumination light intensity and width).

FIG. 7 shows that the profile of the illumination light on the upper surface of the film 460 is dependent on the distance and the orientation of the imaging apparatus 400 with respect to the film 460. Under certain orientations of the imaging apparatus 400, specular reflection can reflect back into the field of view of the image sensor of the imaging apparatus. Because the specular reflected light is typically of greater intensity than the scattered light (from the scattering microparticles), the specular reflected light can dominate the image if the specular reflected light is in the field of view of the image sensor. This can significantly reduce the contrast (and signal-noise-ratio) of the images formed on the image sensor. The amount of specular reflection received by the image sensor can depend on several parameters such as, for example, the field of view of the image sensor, the tilt of the imaging apparatus with respect to the surface of the film, the orientation of the light source with respect to the optical axis of the image sensor, the presence of collimating and/or focusing lenses in both the illumination pathway and the imaging pathway, and/or the like. The specular reflected light can be prevented from reaching the image sensor if the angle of incidence and reflection (that includes the entire specular lobe) can be made to lie outside the field of view of the image sensor. Thus, in some instances, depending on the particular construction, the imaging apparatus 400 can be designed to avoid specular reflections caused by tilt angles that naturally result from either left-handed or right-handed users.

Figure 8:
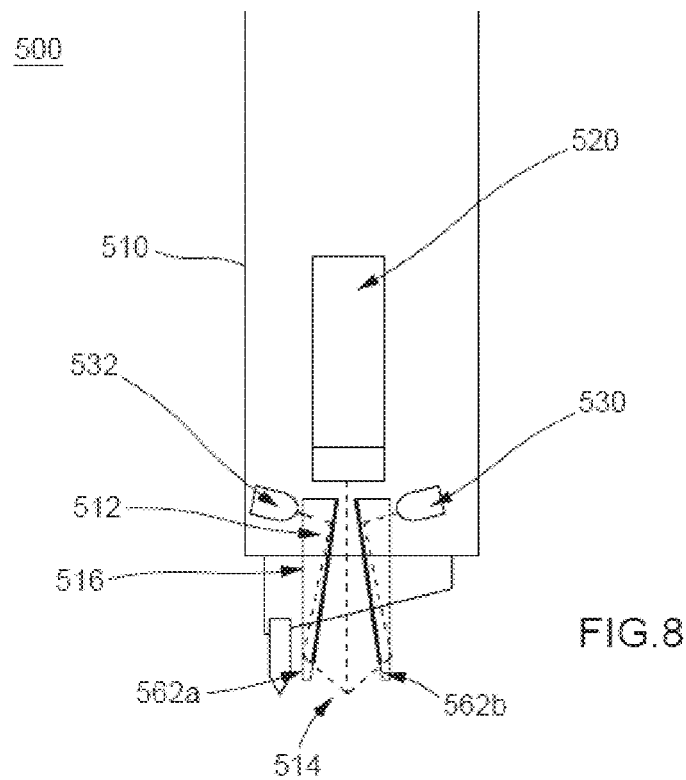
FIG. 8 is a two-dimensional (2-D) cross-section diagram of an imaging apparatus, according to another embodiment.
Figure 9:
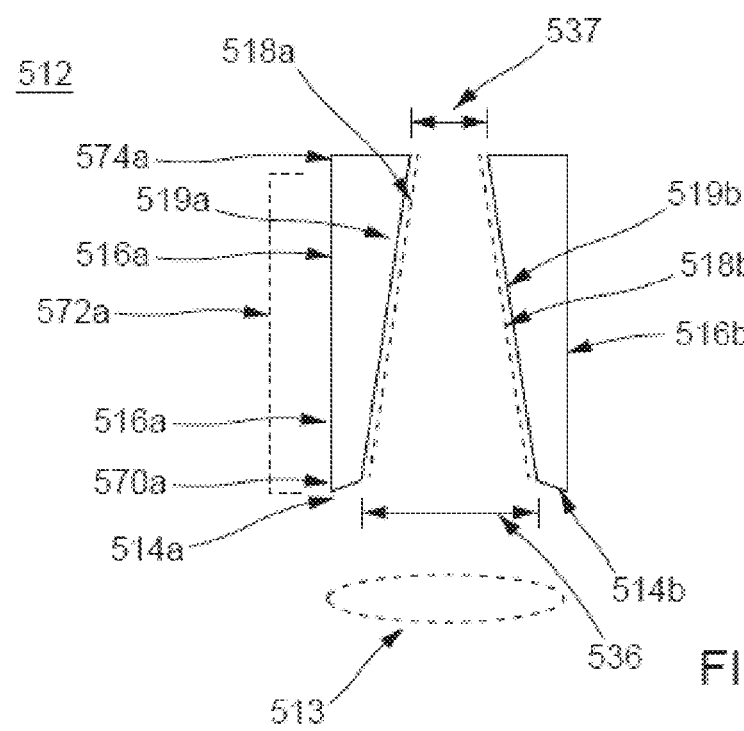
FIG. 9 is a two-dimensional (2-D) cross-section diagram showing an expanded view of the diffusion light guide of FIG. 8.

FIG. 8 is a two-dimensional (2-D) cross-section diagram of an imaging apparatus, according to another embodiment. The imaging apparatus 500 produces multiple diffuse light ring illuminations on the target surface. A detailed diagram of the two-dimensional(2-D) cross-section of the segmented diffusion light guide 512 in FIG. 8 is shown in FIG. 9. Note that each part of the segmented diffusion light guide 512 as shown in FIG. 9 has two distinct internal surfaces 518a and 519a. The inner portion of the internal surface 519a that faces the incident illumination light can have a reflective coating to reflect the incident illumination light. The outer portion of the internal surface 518a can have an absorptive coating to prevent reflections of the incident illumination light from striking the photo-detector or imaging lens of the image sensor 520.

Referring to FIGS. 8 and 9, the imaging apparatus 500 includes a housing 510, an image sensor 520, a first LED 530, a second LED 532, a segmented diffusion light guide 512. The segmented diffusion light guide 512 defines a first diffusion light guide 512a and a second diffusion light guide 512b, where each diffusion light guide defines an exit window 514a or 514b and has an external reflective surface 516a or 516b and an internal absorbing surface 518a or 518b. The first diffusion light guide 512a has a distal end portion 570a and a remaining portion 572a, and the second diffusion light guide 512b has a distal end portion and a remaining portion (not marked in FIG. 9).

In FIGS. 8 and 9, the non-imaging optical system of the imaging apparatus 500 includes the first LED 530, the second LED 532, a first diffusion light guide 512a and a second diffusion light guide 512b (that collectively forms the segmented diffusion light guide 512). The first diffusion light guide 512a is operatively coupled to the first LED 532 and can send a portion of the diffuse light from the distal end portion of the first diffusion light guide 570a in a first substantially arcuate pattern. The second diffusion light guide 512b is operatively coupled to the second LED 530 and can send a portion of the diffuse light from the distal end portion of the second diffusion light guide in a second substantially arcuate pattern such that the first substantially arcuate pattern and the second substantially arcuate pattern collectively define a substantially circular (or annular) pattern. The field of view of the imaging apparatus 500 collectively along the remaining portion of the first diffusion light guide 572a and the remaining portion of the second diffusion light guide is substantially surrounded by the remaining portion of the first diffusion light guide 572a and the remaining portion of the second diffusion light guide.

The non-imaging optical system of the imaging apparatus 500 can output diffuse light in a set of directions from at least a first location of the distal end portion of the non-imaging optical system 562a (see FIG. 8) and a second location of the distal end portion of the non-imaging optical system 562b (see FIG. 8), where at least a portion of the field of view is between the first location 562a and the second location 562b. The image sensor 520 can receive from a surface of the film at least one of (1) a scattered light component associated with the first location 562a, or (2) a scattered light component associated with the second location 562b. In some configurations, an electrical or mechanical controller (not shown in FIGS. 8 and 9) can be used to selectively activate at least one of the first LED 530 or the second LED 532 based on an orientation of the housing 510 relative to the upper surface of the film.

Figure 10:
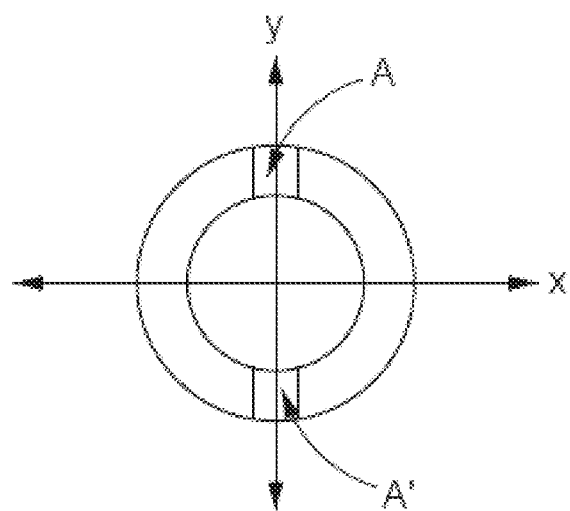
FIG. 10 shows a substantially circular (semi-annular) illumination beam pattern formed at the exit window of the segmented diffusion light guide of the imaging apparatus of FIG. 7.

As discussed above, illumination light from each of the LEDs 530 and 532 is received by each of the segments of the segmented diffusion light guide 512a and 512b. The segmented diffusion-light-guide 512 of the imaging apparatus 500 produces or outputs a semi-annular illumination geometry when both the diffusion light guide segments receive illumination from each of the LEDs 530 and 532 (as shown in FIG. 10). FIGS. 8 and 9 show the segmented diffusion light guide 512 having two segments as a way of example only, and not by limitation. In other configurations, the segmented diffusion light guide 512 can include more than two segments that are either radially symmetrical or radially non-symmetrical. Hence, in other configurations, the imaging apparatus 500 can also include more than two LEDs as light sources. Additionally, the LED light sources 530 and 532 can be controlled to operate independently or in defined combinations. Each of the segments of the segmented diffusion light guide 512 can be tapered to concentrate the illumination light at the exit window and each exit window can be beveled to direct the illumination light at targeted imaging zone 513. The (optional) reflective coating 516a and 516b on the external surface of each segment of the segmented diffusion light guide 512 improves the optical efficiency for one or a range of wavelengths of the received illumination light. The internal surface of each segment of the segmented diffusion light guide 512 can be coated with an absorbing coating 518a and 518b to minimize or reduce reflections and scattering (for one or a range of incident illumination wavelengths) into the image sensor 520. In some configurations, additional focusing and/or beaming lenses and other optical components (e.g., Fresnel prisms) can be added for increased delivery of the incoming light via the illumination pathways and/or increased collection of the scattered light and/or increased rejection of the specular reflected light via the imaging pathway.

An advantage of using the embodiment of the imaging apparatus shown in FIGS. 8 and 9 for detecting the location of the distal end portion of the imaging apparatus 500 with respect to the upper surface of the film is that either of the light sources (e.g., LEDs 530 or 532) can be chosen to illuminate their respective diffusion light guides 512a or 512b based on the orientation of the housing 510 relative to the upper surface of the film. Additionally, the multiple light ring configurations can also be selectively illuminated to avoid or reduce the specular reflection from reflecting back into and being received by the image sensor 520 while the imaging apparatus 500 is held at a tilt angle (i.e., non-zero angle) with respect to the surface of the film. This is because at a specific non-zero tilt angle, the light output from the two or multiple segments of diffusion light guide 512 will have varying angle of incidences with respect to the surface normal. As a result, the light output from a light source(s) can be selected such that the specular reflectance lobe is out of or substantially out of the field view of the image sensor 520. This can significantly increase the sensitivity of the imaging apparatus and improve the precision for detection of the location of the imaging apparatus.

FIG. 10 is the substantially circular (semi-annular) illumination beam pattern formed at the exit window of the segmented diffusion light guide of the imaging apparatus of FIG. 8. FIG. 10 shows two breaks (marked as A and A' in FIG. 10) in the continuity of the circular (or annular) pattern of the illumination beam profile. These break points correspond to the locations where the diffusion light guide has been segmented. Because FIG. 10 shows the diffusion light guide having two segments, two break points exist in the illumination light beam profile. In other configurations, the diffusion light guide can have more than two segments that are either radially symmetrical or radially non-symmetrical. In such configurations, the illumination beam profile can also have more than two break points that are either radially symmetrical or radially non-symmetrical. In some instances, the profile of the illumination beam can spread out laterally (i.e. along the x and y axes) by the time the illumination beams strikes the upper surface of the film (e.g., clean PET film in FIG. 2) due to the effects of scattering (from the air particles) and/or other optical effects. Hence, in such instances, the illumination beam pattern formed at the upper surface of the film may not appear to be as substantially circular (semi-annular) as the image presented in FIG. 10 and instead may appear to be spread out (or smeared). In other instances, the effects of scattering may not be isotropic and hence the amount of scattering of the incident illumination beam along the x-axis can be either greater or lower than that of the scattering along the y-axis. In some instances, the profile of the illumination beam at the upper surface of the film may be substantially oval in shape (with one or multiple break points) instead of being substantially circular (semi-annular) as shown in FIG. 10.

Although FIGS. 1-10 described two separate embodiments of the imaging apparatus that were based on a dark field single ring configuration or a dark field multiple ring configuration, alternative embodiments of the imaging apparatus are possible. FIG. 11 summarizes some examples of possible embodiments. FIG. 11A shows a 2D cross-sectional image of an imaging apparatus 600 in the dark field single ring configuration. The imaging apparatus 600 includes a housing 610, an image sensor 620, a light source 630 (e.g., LED), and a diffusion light guide 612. A film 660 contains the scattering microparticles. Operation of the imaging apparatus 600 shown in FIG. 11A is similar to the operation of the imaging apparatus 300 discussed in FIG. 3. FIG. 11B shows a 2D cross-sectional image of an imaging apparatus 600 in the dark field multiple rings configuration. The imaging apparatus 600 shown in FIG. 11B includes a housing 610, an image sensor 620, light sources 630 and 632 (e.g., LED's), and a (segmented) diffusion light guide 612. A film 660 contains the scattering microparticles. Operation of the imaging apparatus 600 shown in FIG. 11B is similar to the operation of the imaging apparatus 500 discussed in FIG. 8.

FIG. 11C shows a 2D cross-sectional image of an imaging apparatus 600, according to another embodiment. The imaging apparatus 600 shown in FIG. 11C includes a housing 610, an image sensor 620, light sources 630, 632 and 633 (e.g., LED's), a diffusion light guide 612, and a light guiding stylus 635. A film 660 contains the scattering microparticles. In such embodiments, the imaging system 600 can include an a primary illumination (light) source as defined by the LEDs 630 and 632 and the diffusion light guide 612, and an alternative illumination (light) source as defined by the LED 633 and the light guiding stylus 635.

The various embodiments of the imaging apparatus shown in FIGS. 3-11(A-C) can operate either in the dark-field imaging mode or the bright-field imaging mode. In such embodiments, a control module contained within the imaging apparatus that can implement signal processing functionalities can select a particular imaging modality (i.e., bright-field imaging or dark field-imaging) based on the instantaneous or near-instantaneous imaging conditions as described in greater detail herein. The control module can adapt to either a bright-field or dark-field imaging situation that depends on the instantaneous geometrical orientation between the stylus and the surface of the film. Note that in such cases, it is not compulsory to have two or more or more non-imaging (illumination) sources, although more than one illumination source can be acceptable. Thus, any of the embodiments disclosed in FIGS. 3-11(A-C) can operate in the light-filed or dark-field imaging mode if equipped with the appropriate signal processing functionality, and in such cases, the secondary non-imaging illumination source may optionally be omitted.

A control module (not shown in FIGS. 3-11(C)) that can implement signal processing functionalities and is associated with real time or near-real time image processing can select the imaging modality (i.e., either bright-field or dark-field) that is activated based on the instantaneous or near-instantaneous imaging conditions. The control module can be, for example, a hardware module and/or software module stored in a memory and/or executed in a processor on the printed circuit boards (PCB) of the imaging apparatus. For the dark-field image, providing satisfactory exclusion of specular reflection can be achieved and the appropriate image processing methods can be applied by the control module. As described in greater detail herein, the background of the final dark-field image formed at the image sensor will be dark and scattered light from the scattering microparticles will form white dots or spots. For the bright-field image, it is desirable to capture the specular reflected light. Hence, the background of the bright-field image formed on the image sensor will be bright while the location of the scattering microparticles will comparatively darker than the background due the substantially isotropic or substantially semi-isotropic scattering of the incident illumination by the scattering microparticles. Based on the quality of both the dark-field and bright-field image formed on the image sensor, the control module can select the proper method for detecting light spots on a dark background (dark-field imaging) or dark spots on a light background (bright-field imaging). Thus the imaging apparatus can implement a single imaging pathway for operation because at any given time, the imaging apparatus is operating in either the dark-field imaging mode or the bright-field imaging mode. In this embodiment, the optical, imaging and illumination systems remain constant and the image processing methods adapt to the current modality.

When producing the dark-field image, the specular reflected light is either prevented from striking (or being detected by) the image sensor (e.g., image sensor 620 in FIG. 11) or the amount of specular reflected striking (or being detected by) the image sensor is minimized or reduced. Hence, the background of the dark-field image that is formed on the image sensor is dark. The bright spots on the dark-field image appear from the scattered reflection from the scattering microparticles. FIG. 11D shows an example of such a dark-field image. When producing the bright-field image, the specular reflected light is allowed to strike (or be detected by) the image sensor. Hence, the background of the bright-field image that is formed on the image sensor is bright. The dark spots on the bright-field image appear from the scattering microparticles because the scattered reflection (which can be isotropic) from the microparticles reduces the intensity of light reaching the field of view of the image sensor. Hence, light scattered by microparticles appear within an image as comparatively dark with respect to the background.

Figure 12:
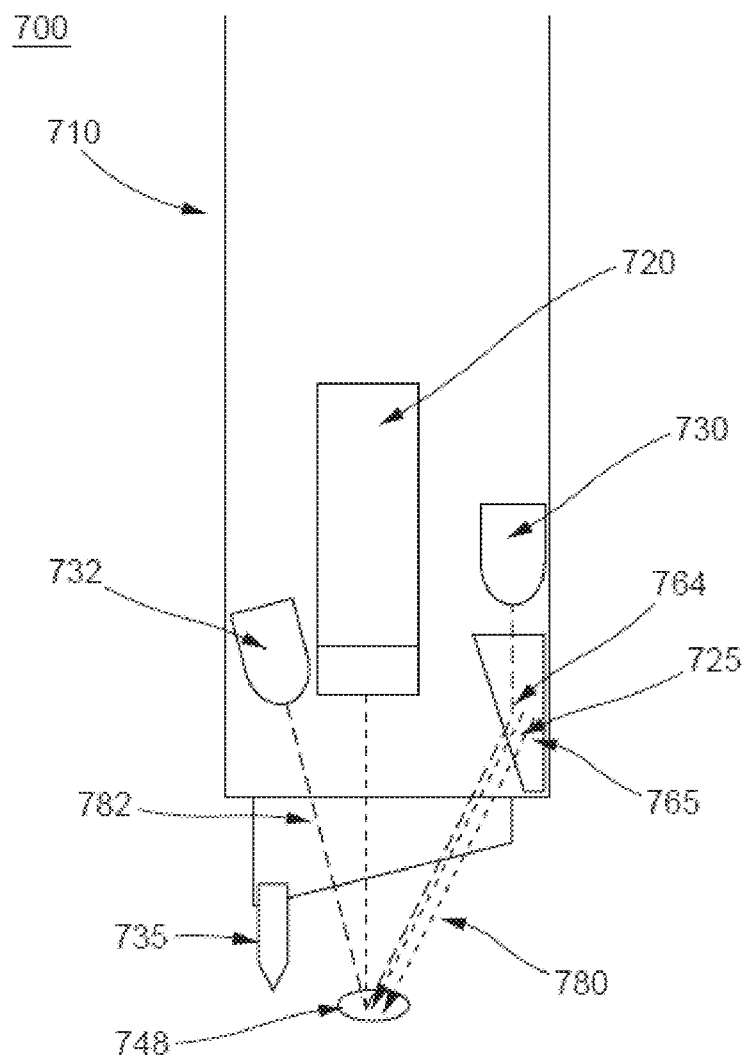
FIG. 12 is a two-dimensional (2-D) cross-section diagram of an imaging apparatus, according to yet another embodiment.

FIG. 12 is a two-dimensional (2-D) cross-section diagram of an imaging apparatus, according to yet another embodiment. In such embodiments, the imaging apparatus illustrates the use of beam steering components and an asymmetric distribution of the non-imaging (illumination) light sources. The imaging apparatus 700 can include an image sensor 720 coupled to or disposed within a housing 710 and having a field of view. The imaging apparatus 700 can include a first non-imaging optical system coupled to the housing 710 that includes a first light source (e.g., LED 730) and a first set of beam steering optical elements (e.g., prism 725) coupled to the housing 710. In such embodiments, the first non-imaging optical system can output (either diffuse or non-diffuse) light in multiple directions from at least a first location 764 and a second location 765 (or multiple locations) of the first non-imaging optical system to produce the (either diffuse or non-diffuse) light illumination pathway 780. The image sensor 720 can receive from a surface of the film at least one of (1) a scattered light component associated with the first location, or (2) a scattered light component associated with the second location. In such embodiments, the image sensor 720 and the first non-imaging optical system can be configured such that the image sensor 720, during operation, does not receive a specular reflected light component associated with the first location and a specular reflected light component associated with the second location to form an optimal dark-field image on the image sensor 720.

The imaging apparatus 700 can also include a second non-imaging optical system coupled to the housing 710 that includes a second light source (e.g., LED 732) and, optionally, a second set of optical elements (not shown in FIG. 12) coupled to or disposed within the housing 710. The second non-imaging optical system can output light to the surface of the film to produce the light illumination pathway 782 that produces a specular reflected light component and/or a scattered light component from the scattering microparticles on the surface of the film. In some instances, the image sensor 720 and the second non-imaging optical system can be collectively configured such that, during operation, the image sensor 720 receives at least a portion of the specular reflected light component output by the surface of the film after being impinged upon by the illumination light from the light illumination pathway 782. In other instances, the image sensor 720 and the second non-imaging optical system can be collectively configured such that, during operation, the image sensor 720 receives at least a portion of the scattered light component from the scattering microparticles on the surface of the film and does not receive a specular reflected light component.

Note that the angle of incidence of the first light illumination pathway 780 is not equal to the angle of incidence of the second first light illumination pathway 782. One or more beam steering optical elements (e.g., prism 725) can be used to vary the angle of incidence of the light illumination pathway (either illumination pathway 780 or illumination pathway 782) to account for topographical variations as the stylus 735 moves over the surface of the film due to, for example, manufacturing imperfections, changes in the user's positioning of the stylus 735, etc. These topographical variations can lead to changes in the angle of the scattered light (from the scattering microparticles) with respect to the image sensor 720. Additionally, the asymmetric distribution of the (non-imaging) light illumination pathways can allow one of the light illumination pathways (either illumination pathway 780 or illumination pathway 782) to be more suitable to illuminate the surface of the film according to different orientations of the stylus 735 with respect to the film. As described above, the embodiment of the imaging apparatus 700 can also be operated in either the dark-field imaging mode or the bright-field imaging mode if a control module can be included in the imaging apparatus 700 that can implement specific signal processing functionalities.

The embodiments of the imaging apparatus discussed in FIGS. 1-12 deal with receiving (or rejecting) the specular reflected light and the scattered light from the scattering microparticles contained within the display film. In other embodiments, however, the imaging apparatus can involve receiving a fluorescent signal generated by fluorescent microparticles embedded within the surface of the display film (instead of scattering microparticles). In such embodiments, the microparticles used can be transparent and can be impregnated with a fluorescent compound that can be tuned to fluoresce at certain wavelengths. One example can involve using fluorescent microparticle that can be excited by the imaging apparatus at ultra-violet (UV) wavelengths and generating fluorescence at infra-red (IR) wavelengths.

The large Stokes shift (difference between the excitation wavelength and the emission wavelength of the fluorescent microparticles) can be used to improve the signal-noise ratio of the image formed at the image sensor of the imaging apparatus. In such embodiments, the imaging apparatus can be configured to respond to the IR fluorescence signal and reject all specular reflected light in the UV range. The rejection of the specular reflected light and/or any bleedthrough of the excitation illumination in the UV range can be implemented by using the appropriate emission filters in the imaging pathways. This configuration, however, can involve the addition of more optical components in the imaging apparatus (e.g., excitation filters, emission filters, etc.).

Any of the imaging apparatus described herein can include any suitable processor such that the generator and/or module performs the functions described herein. Such processors can be a general-purpose processor (e.g., a central processing unit (CPU)) or other processor configured to execute one or more instructions stored in the memory. In some embodiments, the processor can alternatively be an application-specific integrated circuit (ASIC) or a field programmable gate array (FPGA). The processor can be configured to execute specific modules and/or sub-modules that can be, for example, hardware modules, software modules stored in the memory and executed in the processor, and/or any combination thereof. The memory included in the imaging apparatus can be, for example, flash memory, one time programmable memory, a random access memory (RAM), a memory buffer, a hard drive, a read-only memory (ROM), an erasable programmable read-only memory (EPROM), and/or so forth. In some embodiments, the memory includes a set of instructions to cause the processor to execute modules, processes and/or functions used to generate, control, amplify, and/or transfer electric current to another portion of the imaging apparatus.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. Additionally certain events may be performed concurrently in parallel processes when possible, as well as performed sequentially. While the embodiments have been particularly shown and described, it will be understood that various changes in form and details may be made.

Although various embodiments have been described as having particular features and/or combinations of components, other embodiments are possible having a combination of any features and/or components from any of embodiments where appropriate. For example, any of the embodiments of the imaging apparatus described herein can include multiple light sources, multiple imaging sensors with integrated control electronics for decoding the co-ordinates of the position-coding patterns on the display surface, and transmitters for transmitting the position co-ordinates to an external device.

What is claimed is:

1. An apparatus, comprising:
   a stylus housing;
   an optical radiation source coupled to the stylus housing and configured to output diffuse light in a plurality of directions from a stylus tip coupled to the stylus housing to a surface to produce scattered light;
   an optical sensor configured to receive at least a portion of the scattered light and generate a signal indicating the portion of the scattered light received by the optical sensor; and
   a controller configured to track a position of the stylus tip relative to the surface based, at least in part, on the signal;
   wherein:
      the optical radiation source is configured such that a specular reflected light resulting from reflection of the diffuse light off of the surface is outside of a field of view of the optical sensor; and
      the optical radiation source comprises a first optical radiation source and a second optical radiation source, and the controller is configured to activate one of the first optical radiation source or the second optical radiation source based on an orientation of the stylus housing relative to the surface to maintain the specular reflected light outside of the field of view of the optical sensor.

2. The apparatus of claim 1, wherein the surface includes a touchscreen surface of a portable electronic device, and the controller is configured to control a communication device operably coupled to the stylus housing to transmit information indicating the tracked position of the stylus tip to the portable electronic device.

3. The apparatus of claim 1, wherein the optical sensor comprises two or more photo-detectors.

4. The apparatus of claim 1, wherein the optical radiation source comprises one or more light emitting diodes.

5. The apparatus of claim 1, wherein the optical radiation source comprises one or more semiconductor lasers.

6. The apparatus of claim 1, wherein the surface includes a clear film coated with scattering microparticles, and the scattered light is produced by the diffuse light scattering against the scattering microparticles.

7. The apparatus of claim 1, wherein the diffuse light comprises ultraviolet radiation.

8. The apparatus of claim 1, wherein the diffuse light comprises infrared radiation.

9. A method of operating a stylus device, the method comprising:
   transmitting optical radiation from within a stylus housing to a surface from a tip of the stylus device;
   receiving scattered light within the stylus housing through the tip of the stylus device, the scattered light including a portion of radiation scattered by the surface responsive to the optical radiation;
   determining a property of the scattered light received through the tip;
   tracking a location of the tip of the stylus device based, at least in part, on the property of the scattered light received through the tip;
   wherein transmitting optical radiation from within the stylus housing comprises:
      transmitting the optical radiation such that a specular reflected light resulting from reflection of the diffuse light off of the surface is outside of a field of view of an optical sensor receiving the scattered light; and
      transmitting the optical radiation from a first optical radiation source and a second optical radiation source, and activating, with a controller, one of the first optical radiation source or the second optical radiation source based on an orientation of the stylus housing relative to the surface to maintain the specular reflected light outside of the field of view of the optical sensor.

10. The method of claim 9, wherein the property of the scattered light includes a power of the scattered light received through the tip.

11. The method of claim 10, further comprising transmitting an output voltage indicating the power of the scattered light to the controller.

12. The method of claim 9, further comprising applying a film coated with scattering micro-particles to the surface to improve scattering characteristics of the surface.

13. The method of claim 12, wherein applying a film coated with scattering micro-particles to the surface includes applying a clear polyethylene terephthalate (PET) film coated with the scattering micro-particles to the surface.

14. The method of claim 12, wherein applying a film coated with scattering micro-particles to the surface includes applying the film to a touchscreen display of a portable electronic device.

15. The method of claim 9, wherein transmitting optical radiation from within a stylus housing to a surface from a tip of the stylus device comprises transmitting one of infrared radiation or ultraviolet radiation from the tip of the stylus device.

* * * * *